United States Patent Office 3,039,880
Patented June 19, 1962

3,039,880
PROCESS FOR PREPARATION OF FLAVOURING AND THE RESULTING PRODUCT
Yurio Kawamura, Tokyo, Teikichi Tamuki, Kawasaki City, Kuniharu Takenouchi, Tokyo, Michio Satani, Kawasaki City, and Yoshiki Sakata and Takemi Hanaoka, Yokohama, Japan, assignors to Ajinomoto Co., Inc., Tokyo, Japan
No Drawing. Filed Nov. 15, 1960, Ser. No. 69,290
Claims priority, application Japan Dec. 17, 1959
7 Claims. (Cl. 99—143)

This invention relates to a process for the preparation of a flavouring which admirably serves as an improved ordinary table salt.

It is a commonly recognized fact that table salt or common salt, i.e. sodium chloride, has a marked tendency to absorb atmospheric moisture, thus forming many lumps or agglomerates of crystals, which pass through the holes of a salt shaker top only with difficulty.

Moreover, ordinary table salt does not fully satisfy the taste of epicures on account of its severe saltiness.

Addition of more than 5%, by weight, of monosodium glutamate to common salt multiplies its flavouring power and simultaneously makes it less salty.

However, simple mixing of common salt with monosodium glutamate has the following shortcomings:

(1) It is actually impossible to mix them homogeneously, because of the wide difference of specific gravity between them (specific gravity of monosodium glutamate is 1.635 while that of common salt is 2.16) and further of the marked difference of their crystal forms (the crystal of monosodium glutamate is of a long prismatic form while common salt is of a cubic form).

(2) Mixing of monosodium glutamate with common salt rather increases the aforementioned tendency of agglomeration of the crystals.

We have found that, when crystals of table salt are mixed with a fine powder of monosodium glutamate in the amount of 5 to 30 percent by weight of the table salt, sprayed with an aqueous solution of carboxy-methyl-cellulose and then dried, a novel flavouring is obtained which has a superior free flowing property under normal humidity conditions.

We measured the free flowing property in the following manner: a sample was lightly poured into a glass cone of 2 cm. in diameter at its bottom and 7 cm. high; a glass plate was put on it; the glass cone with the glass plate was turned upside down; the glass cone was raised as slowly as possible; and the diameter ($d$) and the height ($h$) of the thus formed conical pile or deposit were measured. The ratio $d/h$ was named "degree of free flowing." The larger the value is, the more freely the sampled material flows.

The following table illustrates the large differences found between the degrees of free flowing of a flavouring obtained according to this invention as in Example 1 and those of common salt or a mixture of common salt and monosodium glutamate (100:20) after they have been allowed to absorb atmospheric moisture (relative humidity: 90%) for certain periods.

TABLE 1

Comparison of Degrees of Free Flowing

| Period (hr.) | Common salt | | Mixture | | The novel flavouring | |
|---|---|---|---|---|---|---|
| | Absorbed water, percent | Degree of free flow | Absorbed water, percent | Degree of free flow | Absorbed water, percent | Degree of free flow |
| 0 | 0 | 2.52 | 0 | 2.50 | 0 | 2.49 |
| 2 | 0.169 | 2.14 | 0.195 | 1.99 | 0.205 | 2.41 |
| 4 | 0.286 | 0.97 | 0.344 | 0.90 | 0.356 | 2.49 |
| 6 | 0.406 | 0.88 | 0.476 | 0.88 | 0.506 | 2.37 |
| 24 | 1.502 | 0.86 | 1.748 | 0.85 | 1.676 | 2.49 |

As shown in Table 1, the flavouring according to this invention absorbs a somewhat larger amount of moisture but its degree of free flowing remains unchanged even after 24 hours' exposure in 90% relative humidity. This differs sharply from the remarkable decrease in the degree of free flowing of common salt and the mixture.

Sodium chloride is a fairly hygroscopic compound and the critical point at which sodium chloride begins to absorb moisture is a relative humidity of approximately 75 percent. When common salt has absorbed moisture, the surface of each crystal is covered with a film of its saturated aqueous solution and turns to be adhesive so that common salt loses the free flowing property in a marked degree. However, each grain of the flavouring obtained according to this invention has a porous surface structure composed of monosodium glutamate particles, which is capable of containing the absorbed water and remains dry outside. When common salt is perfectly coated according to this invention, each crystal is covered with a layer which begins to absorb moisture at a relative humidity of approximately 90 percent and absorption of moisture is performed by the surface layer of each crystal of common salt.

When wet common salt, each crystal of which carries a film of its saturated solution, is dried, the formed fine crystals, due to the evaporation of water, cement the crystals of common salt together, lumps or agglomerates of crystals being thus formed. On the contrary, if a crystal of the novel flavouring absorbs moisture through its monosodium glutamate coating and fine crystals are formed on its surface when dried, the coat of said monosodium glutamate is so fragile that the lumps are easily disintegrated.

According to the present invention, common salt of 30–80 mesh size is mixed with finely pulverized monosodium glutamate having less than 150 meshes size in the amount of 5–30% by weight of said common salt a certain quantity of an aqueous solution of an inherent binder, such as sodium alginate, soluble starch, carboxy-methyl-cellulose or gum arabic, of a certain concentration is sprayed on to it, the components are thoroughly mixed and the mixture is then dried.

We found that the concentration of an aqueous binder solution of carboxy-methyl-cellulose should be 0.5–5 grams of CMC per cc. of solution. The amount of the binder solution is 2–7 cc. per 100 grams of the mixture of common salt and monosodium glutamate. The following table shows the results of studies on the relations between the concentration and the amount of said aqueous solution of carboxy-methyl-cellulose sprayed on the mixture of common salt crystals and monosodium glutamate powder in a ratio of 100/20.

TABLE 2

| Concentration (vol./wt.) | Amount of solution (vol./wt.) | State of coating |
|---|---|---|
| Below 0.5% | Below 2% | Incomplete coating. Free M.S.G. powder remains |
|  | 2% to 7% | Still incomplete coating. Less amount of free powder remains. |
|  | Above 7% | Becomes lumpy when dried. |
| 0.5% to 5.0% | Below 2% | Incomplete coating. Free M.S.G. powder remains. |
|  | 2% to 7% | Complete and uniform coating. Almost no free powder remained. |
|  | Above 7% | Many lumps when dried. |
| Above 5.0% | Below 2% | Becomes lumpy when dried. |
|  | 2% to 7% | Many lumps when dried. |
|  | Above 7% | Do. |

We also found that 2–7%, based on the weight of common salt, of an aqueous solution of soluble starch, sodium alginate or gum arabic should be used in the following concentration:

| | Percent |
|---|---|
| Sodium alginate | 0.1–0.5 |
| Soluble starch | 2.0–10.0 |
| Gum arabic | 2.0–10.0 |

The new flavouring obtained according to the present invention not only maintains its free flowing property well for a long period but tastes mild, giving the taste of monosodium glutamate first and then the combined flavor of said glutamate and table salt.

The following examples illustrate the invention but are not to be construed as limiting the same:

EXAMPLE 1

1 kg. of commercial grade sodium chloride having the crystal size of 30 to 80 meshes was mixed with 200 g. of pulverized monosodium glutamate finer than 150 meshes in a drum mixer for 5 minutes. 40 cc. of 0.5% solution of carboxy-methyl-cellulose were sprayed onto it and the mixing was continued for 10 more minutes and the grains were dried in a hot-air dryer. The product weighed 1.2 kg.

EXAMPLE 2

1 kg. of commercial grade sodium chloride having the crystal size of 30 to 80 meshes was mixed with 100 g. of pulverized monosodium glutamate finer than 150 meshes in a kneader for about 5 minutes. 50 cc. of about 5% solution of soluble starch was sprayed onto it and the kneading was continued for another 10 minutes and the grains were dried by hot air. The product weighed 1.1 kg.

What is claimed is:

1. A process for the preparation of a flavoring, which comprises the steps of mixing sodium chloride crystals having a mesh size of 30 to 80 with pulverized monosodium glutamate having a mesh size of finer than 150 in an amount of 5% to 30%, by weight of the sodium chloride, spraying 2 to 7 cubic centimeters of an aqueous solution of an inert binder per 100 grams of the sodium chloride-monosodium glutamate mixture on the mixture, further mixing and drying the mixture.

2. The process of claim 1, wherein the binder is selected from the group consisting of carboxy-methyl cellulose, soluble starch, sodium alginate and gum arabic.

3. The process of claim 2, wherein the concentration of the aqueous solution is from 0.1 to 10.0 grams of binder per 100 cubic centimeters of solution.

4. A process for the preparation of a flavoring, which comprises the steps of mixing sodium chloride crystals having a mesh size of 30 to 80 with pulverized monosodium glutamate having a mesh size of finer than 150 in an amount of 5% to 30%, by weight of the sodium chloride, spraying 2 to 7 cubic centimeters of an aqueous solution of carboxy-methyl cellulose per 100 grams of the sodium glutamate mixture on the mixture, the concentration of the solution being from 0.5 to 5 grams of carboxy-methyl cellulose per 100 cubic centimeter of solution, further mixing and drying the mixture.

5. A flavoring comprising sodium chloride crystals having a mesh size of 30 to 80, each crystal having a coating consisting of monosodium glutamate of a mesh size finer than 150 in an amount of 5% to 30%, by weight of the sodium chloride, and an inert binder in an amount of 0.002 to 0.7%, by weight of the sodium chloride-monosodium glutamate mixture.

6. The flavoring of claim 5, wherein the binder is selected from the group consisting of carboxy-methyl cellulose, soluble starch, sodium alginate and gum arabic.

7. A flavoring comprising sodium chloride crystals having a mesh size of 30 to 80, each crystal having a coating consisting of monosodium glutamate of a mesh size finer than 150 in an amount of 5% to 30%, by weight of the sodium chloride, and carboxy-methyl cellulose in an amount of 0.01 to 0.35%, by weight of the sodium-chloride-monosodium glutamate mixture.

References Cited in the file of this patent

UNITED STATES PATENTS

| 2,046,862 | Allen | July 7, 1936 |
| 2,421,185 | Comstock | May 27, 1947 |
| 2,774,673 | Young | Dec. 18, 1956 |
| 2,845,354 | Ogawa et al. | July 29, 1958 |

OTHER REFERENCES

"Methyl Cellulose in Pharmacy," by Bergy, American Professional Pharmacist, vol. 5, No. 12, December 1939, pages 691–694.

"Rayon Textile Monthly" (New York), 25:207, April 1944.